(12) United States Patent
Yamada et al.

(10) Patent No.: US 12,362,510 B2
(45) Date of Patent: Jul. 15, 2025

(54) CONTACT MEMBER, CONNECTOR, COMPOSITION, AND METHOD FOR PRODUCING CONTACT MEMBER

(71) Applicant: Japan Aviation Electronics Industry, Limited, Tokyo (JP)

(72) Inventors: Kazuhiko Yamada, Tokyo (JP); Akiko Suzuki, Tokyo (JP); Akinobu Sato, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 405 days.

(21) Appl. No.: 17/895,695

(22) Filed: Aug. 25, 2022

(65) Prior Publication Data
US 2022/0416460 A1   Dec. 29, 2022

Related U.S. Application Data

(63) Continuation of application No. PCT/JP2021/006325, filed on Feb. 19, 2021.

(30) Foreign Application Priority Data

Mar. 27, 2020  (JP) ................................ 2020-057814
Jan. 25, 2021  (JP) ................................ 2021-009500

(51) Int. Cl.
*H01R 13/03* (2006.01)
*B22F 1/068* (2022.01)
(Continued)

(52) U.S. Cl.
CPC ............. *H01R 13/03* (2013.01); *B22F 1/068* (2022.01); *B22F 1/102* (2022.01); *C10M 169/04* (2013.01);
(Continued)

(58) Field of Classification Search
CPC .......... H01B 1/22; H01H 1/023; H01H 1/025; H01R 13/03; C10M 169/04; B22F 1/102
See application file for complete search history.

(56) References Cited

U.S. PATENT DOCUMENTS 6,372,337 B2 *   4/2002   Takahashi ............ C10M 107/50
                                                         524/786
2004/0142604 A1   7/2004   Ladin et al.
(Continued)

FOREIGN PATENT DOCUMENTS

EP   3419118      * 12/2018
EP   3419118 A1   * 12/2018
(Continued)

OTHER PUBLICATIONS

Chemours: "KrytoxTM Performance Lubricants Product Overview", chemours, pp. 1-20, URL:https://www.krytox.com/fr/-/media/files/krytox/krytox-product-overview.pdf (2015).

*Primary Examiner* — Mark Kopec
(74) *Attorney, Agent, or Firm* — MUNCY, GEISSLER, OLDS & LOWE, P.C.

(57) ABSTRACT

The present invention provides a contact member that strikes a balance between low electrical resistance and sliding durability under the condition of load as low as about 0.1 N. A contact member of the invention has a metal base and a coating disposed on at least part of the metal base. The coating contains fluorinated oil having a polar group, and metal particles surface-treated with a fluorine-based compound having a polar group.

4 Claims, 10 Drawing Sheets

(51) Int. Cl.
| | |
|---|---|
| *B22F 1/102* | (2022.01) |
| *C10M 169/04* | (2006.01) |
| *C23C 22/02* | (2006.01) |
| *C23C 24/10* | (2006.01) |
| *C23C 26/00* | (2006.01) |
| *H01B 1/22* | (2006.01) |
| *H01H 1/025* | (2006.01) |
| *B60L 53/16* | (2019.01) |
| *C10L 1/20* | (2006.01) |
| *C10M 147/00* | (2006.01) |
| *C10N 10/02* | (2006.01) |
| *C10N 20/00* | (2006.01) |
| *C10N 20/06* | (2006.01) |
| *C10N 30/00* | (2006.01) |
| *C10N 30/06* | (2006.01) |
| *C10N 40/14* | (2006.01) |
| *C10N 50/00* | (2006.01) |
| *C10N 50/02* | (2006.01) |
| *C10N 70/00* | (2006.01) |
| *C10N 80/00* | (2006.01) |
| *C22C 1/04* | (2023.01) |
| *C23C 22/00* | (2006.01) |
| *H01R 12/55* | (2011.01) |
| *H01R 12/73* | (2011.01) |
| *H01R 13/04* | (2006.01) |
| *H01R 13/11* | (2006.01) |
| *H01R 43/16* | (2006.01) |

(52) U.S. Cl.
CPC .............. *C23C 22/02* (2013.01); *C23C 24/10* (2013.01); *C23C 26/00* (2013.01); *H01B 1/22* (2013.01); *H01H 1/025* (2013.01); *B60L 53/16* (2019.02); *C10L 1/20* (2013.01); *C10L 1/206* (2013.01); *C10M 147/00* (2013.01); *C10M 2201/04* (2013.01); *C10M 2201/05* (2013.01); *C10M 2211/0406* (2013.01); *C10M 2211/06* (2013.01); *C10M 2211/063* (2013.01); *C10M 2213/06* (2013.01); *C10M 2213/0606* (2013.01); *C10N 2010/02* (2013.01); *C10N 2020/06* (2013.01); *C10N 2020/061* (2020.05); *C10N 2030/06* (2013.01); *C10N 2030/28* (2020.05); *C10N 2040/17* (2020.05); *C10N 2050/015* (2020.05); *C10N 2050/02* (2013.01); *C10N 2070/00* (2013.01); *C10N 2080/00* (2013.01); *C22C 1/0466* (2013.01); *C23C 22/00* (2013.01); *H01R 12/55* (2013.01); *H01R 12/73* (2013.01); *H01R 13/04* (2013.01); *H01R 13/111* (2013.01); *H01R 13/113* (2013.01); *H01R 43/16* (2013.01)

(56) References Cited

U.S. PATENT DOCUMENTS

| | | |
|---|---|---|
| 2006/0134403 A1 | 6/2006 | Ohwaki et al. |
| 2015/0357737 A1 | 12/2015 | Sunaga et al. |

FOREIGN PATENT DOCUMENTS

| | | |
|---|---|---|
| JP | 4348288 B2 | 10/2009 |
| JP | 2012018869 A | 1/2012 |
| JP | 2014135191 A | 7/2014 |

\* cited by examiner

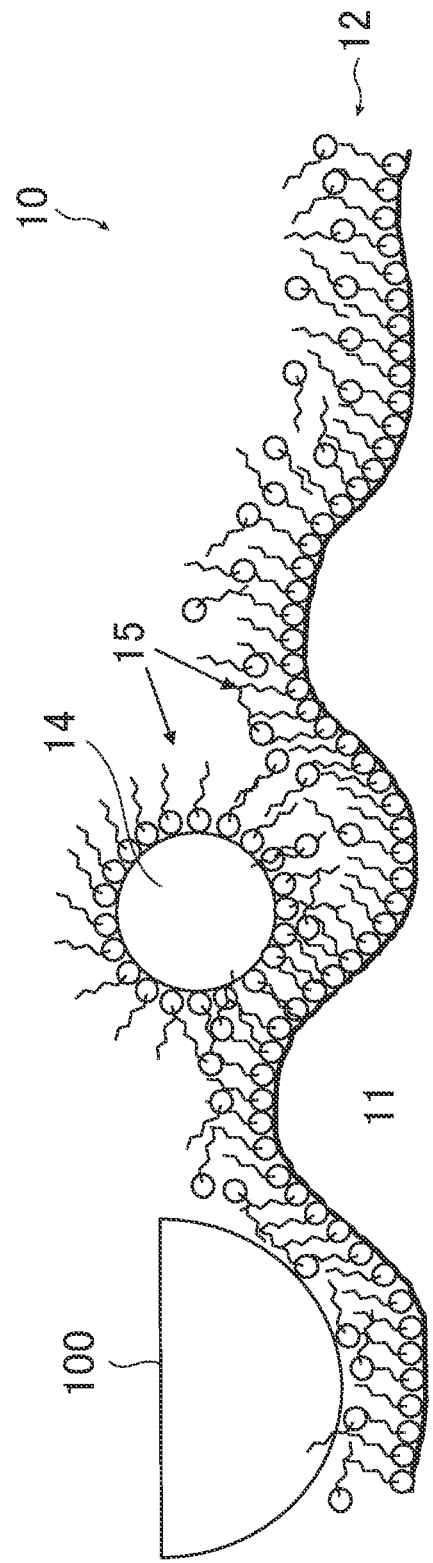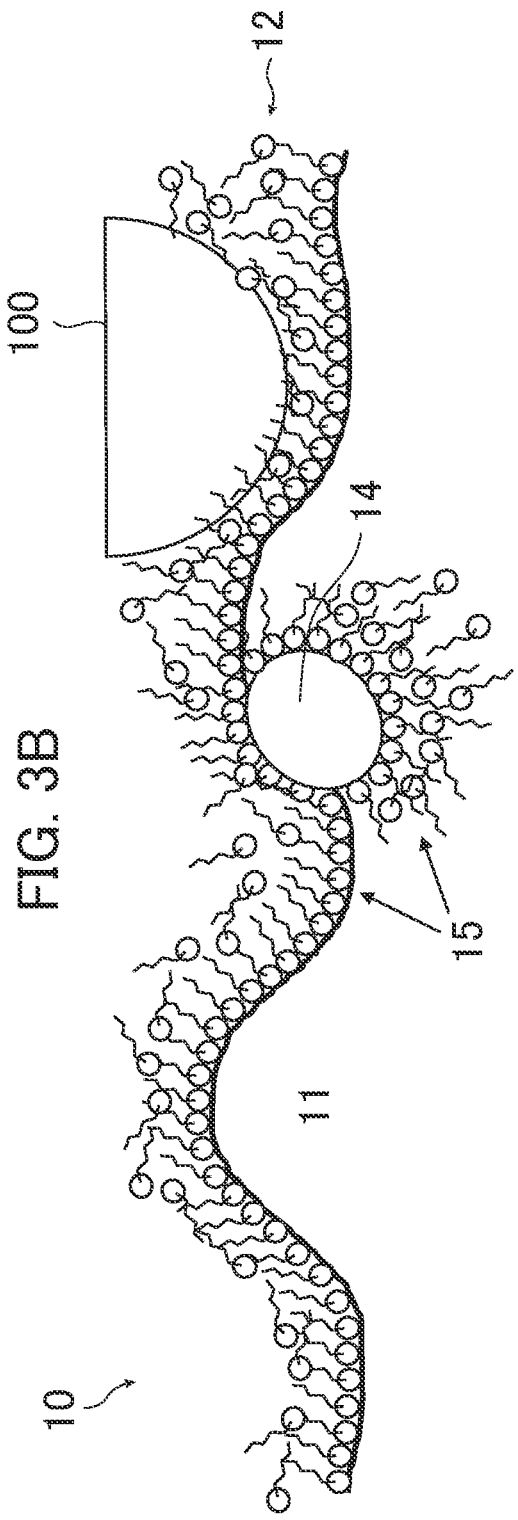

CONTACT MEMBER, CONNECTOR, COMPOSITION, AND METHOD FOR PRODUCING CONTACT MEMBER

CROSS REFERENCE TO RELATED APPLICATIONS

This application is a Continuation of co-pending International Application No. PCT/JP2021/006325, filed on Feb. 19, 2021, for which priority is claimed under 35 U.S.C. § 120; and this application claims priority of Application No. 2020-057814 filed in Japan on Mar. 27, 2020 and Application No. 2021-009500 filed in Japan on Jan. 25, 2021 under 35 U.S.C. § 119, the entire contents of all of which are hereby incorporated by reference.

BACKGROUND OF THE INVENTION

The present invention relates to a contact member, a connector, a composition, and a method for producing the contact member.

Efforts have been made to reduce resistance in electrical connection parts (connectors) that need to pass high current such as charging plugs for electrical vehicles, in order to minimize heat generation or power loss. Besides, for connectors used for electrical connection in devices such as mobile devices and between such devices, there are demands for smaller size and height or ease of mounting, and efforts have been made to reduce an insertion and extraction force and a contact pressure, more specifically, reduce resistance under the condition of load as low as about 0.1 N. This is why silver, gold, and copper, which have a low electrical resistivity, are used primarily as the material of contacts. Sometimes, gold- or silver-plated copper or copper alloys are used.

Situations arise where two surfaces of electrical contacts repeatedly slide in contact with each other under a constant pressure, such as when two surfaces slide on each other due to repeated insertion and extraction, or when the contacts are subjected to vibration in the environment of use after being fitted together. Such sliding leads to adhesive wear at the contacts, and results in problems such as raised electrical resistance due to worn surfaces undergoing transformation such as oxidation, or an increase in an insertion and extraction force due to adhesion.

Coating contact portions with organic component-containing compositions for providing lubrication effects is widely practiced to minimize such wear caused by sliding at contacts. JP 2014-135191 A discloses a technique for reducing friction resistance wherein a layer of silver plating is formed in electrical contact portions of a connecter terminal, on which a coating layer is further formed, the coating layer consisting of a film formed by contact with a solution containing thiol and benzotriazole. JP 4348288 B discloses a technique for forming a coating of a mixture of fluororesin fine particles and fluorinated oil on electrical contact portions. Aside from that, it is known that wear of contacts caused by sliding can be minimized when the contacts are brought in contact at a low load, while in this case, it is difficult to keep contact resistance low. JP 2012-18869 A discloses a technique for providing a projection projecting from a contact surface that is to contact a contact object, as a method for reducing contact resistance even at a low contact pressure, specifically, at a load as low as about 0.1 N.

SUMMARY OF THE INVENTION

Meanwhile, there are demands in recent years for contact members that allow easy insertion and extraction or easy mounting, specifically, contact members that are low in resistance both at the start of sliding and during sliding even with a small insertion force or a low contact pressure (low load). More specifically, it is desired for contact members to be low in resistance under the condition of load as low as about 0.1 N both at the start of sliding and during sliding. Being low in resistance both at the start of sliding and during sliding as noted above is herein referred to also as showing low electrical resistance.

The present inventors looked into the techniques described in JP 2014-135191 A, JP 4348288 B, and JP 2012-18869 A and found that no investigation was conducted on the electrical resistance at the start of sliding as well as during sliding, and it was not clear if these techniques were able to achieve low resistance both at the start of sliding and during sliding, particularly under the condition of load as low as about 0.1 N.

Namely, a contact member that strikes a balance between low electrical resistance and sliding durability is not found in prior art and is desired to be developed.

The phrase "showing sliding durability", as used herein, is intended to mean having a low friction coefficient during sliding, as well as withstanding a large number of sliding cycles until a metal base in the contact member becomes exposed during sliding.

In view of the above circumstances, an object of the present invention is to provide a contact member that strikes a balance between low electrical resistance and sliding durability under the condition of load as low as about 0.1 N.

Intensive research conducted by the present inventors led to the finding that the above problem is able to be solved by the following configurations.

(1) A contact member comprising: a metal base; and a coating disposed on at least part of the metal base, the coating containing fluorinated oil having a polar group, and metal particles surface-treated with a fluorine-based compound having a polar group, wherein the metal particles have an average aspect ratio (length of long axis/length of short axis) of 30 or less.

(2) The contact member according to (1), wherein a metal of the metal base is identical to that of the metal particles.

(3) The contact member according to (1) or (2), wherein the polar group is a hydroxyl group.

(4) A connector comprising the contact member according to any one of (1) to (3).

(5) A composition used for formation of a coating of a contact member including a metal base and the coating disposed on at least part of the metal base, the composition comprising: fluorinated oil having a polar group; and metal particles surface-treated with a fluorine-based compound having a polar group, wherein the metal particles have an average aspect ratio (length of long axis/length of short axis) of 30 or less.

(6) A method for producing the contact member according to any one of (1) to (3), comprising the step of forming the coating by supplying the composition according to (5) on the metal base.

The present invention can provide a contact member that strikes a balance between low electrical resistance and sliding durability under the condition of load as low as about 0.1 N.

BRIEF DESCRIPTION OF THE DRAWINGS

FIGS. 3A and 3B are schematic diagrams for describing a presumed mechanism of a contact member according to the present invention.

DETAILED DESCRIPTION OF THE INVENTION

Figure 1:
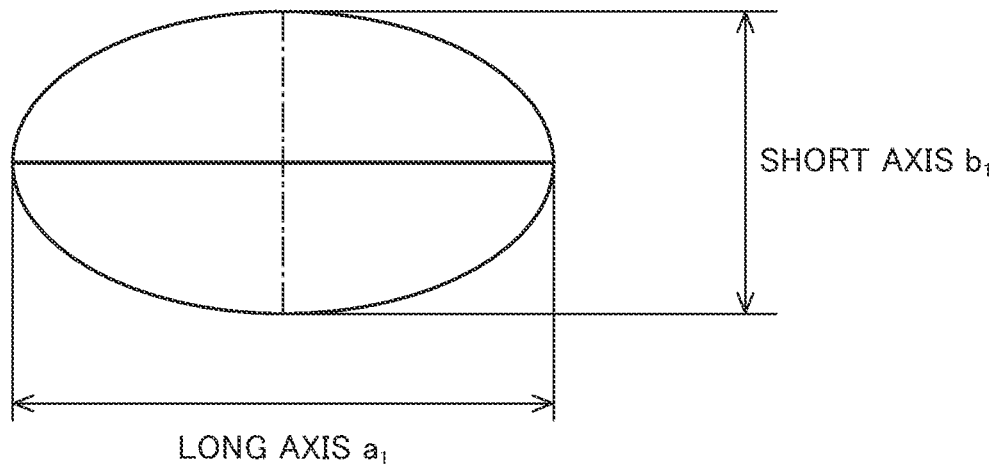
FIG. 1 is a diagram showing a specified metal particle having a spheroidal shape.

Embodiments of this invention are described below based on the appended drawings.

Any numerical range expressed using "to", as used herein, is intended to include the values recited before and after "to" as the lower limit and upper limit.

A contact member according to the present invention includes a metal base and a coating disposed on at least part of the metal base. The coating contains fluorinated oil having a polar group, and metal particles surface-treated with a fluorine-based compound having a polar group.

Various parts included in the contact member of the present invention are described in detail below.

Metal Base

The metal base constitutes an electrical contact in the contact member of the present invention.

Materials constituting the metal base are not limited in particular and desired to be low in electrical resistance. Preferable constituent materials for the metal base are silver, gold, or copper.

The metal base may have a single-layer structure, or a multilayer structure.

In the case where the metal base has a multilayer structure, the metal base may have a base material (metal support) and a plating layer disposed on a surface of the base material. While examples of metals for the plating layer particularly low in electrical resistance are gold, silver, and copper, materials constituting the plating layer are not limited in particular and may be other metals such as, for example, tin, nickel, platinum, rhodium, and various alloys made by adding other metals to these metals to adjust hardness or corrosion resistance, i.e., any metal having electrical conductivity and useable as plating metal.

The surface of the metal base may be treated in various ways. For example, the metal base may be surface-treated to prevent discoloration. One example of surface treatment for preventing discoloration is a treatment of forming a film of alkanethiol on the surface of the metal base (if the metal base has a plating layer, on the surface of the plating layer).

The metal base has surface roughness, in most cases with a maximum height Ry (maximum height Ry of surface roughness of the surface on a coated side of the metal base) of 0.1 μm to 5.0 μm, but not particularly limited thereto. The maximum height Ry is preferably 0.5 μm to 1.7 μm for better sliding durability of the contact member.

The maximum height Ry of the surface roughness of the metal base can be controlled by a known method. For a metal base that does not have a plating layer, for example, the maximum height of surface roughness can be controlled by machining conditions of a cutting operation such as cutting depth and feed pitch, or by surface treatment such as blasting or chemical etching after the cutting operation. For a metal base that has a plating layer, the maximum height of surface roughness can also be controlled by plating conditions such as deposition speed and temperature.

Coating

The coating is a layer disposed on at least part of the metal base described above.

The coating may be disposed on an entire surface of the metal base, or on some part of the metal base. In cases where the coating is disposed on some part of the metal base, the coating may be located on one or both of opposing two main surfaces of the metal base.

Fluorinated Oil Having a Polar Group

The coating contains fluorinated oil having a polar group (hereinafter also referred to simply as "specified oil").

Fluorinated oil is a compound that contains a fluorine atom in the molecule and takes on an oil form. Oil form here is intended to mean a liquid form at room temperature (23° C.)

Fluorinated oil often has a shear viscosity of 0.7 to 2.5 Pas in a shear rate range of 0.01 to 1000 $s^{-1}$, and preferably has a shear viscosity of 0.1 to 5.0 Pas in a shear rate range of 0.01 to 1000 $s^{-1}$.

The molecular weight of the specified oil is not limited in particular. For striking a balance between low electrical resistance and sliding durability, the specified oil preferably has a molecular weight of 300 to 2000, and more preferably 300 to 1000.

Here, the term "molecular weight" is intended to mean chemical formula weight. Note that, however, mass-average molecular weight is used as the molecular weight for polymer or oligomer compounds whose chemical formula weight cannot be specified uniquely for reasons such as the chemical formula weight being different depending on individual molecules. The method for measuring the mass-average molecular weight is not limited in particular. Preferably, the mass-average molecular weight may be measured using gel permeation chromatography (GPC). The standard polymer and solvent (mobile phase) used for the measurement of mass-average molecular weight by GPC may be selected as suited to a target fluorinated oil whose mass-average molecular weight is to be measured.

Examples of a polar group in the specified oil include, but not particularly limited to, a hydroxyl group, a thiol group, an amino group, an epoxy group, a methacryloxy group, an acryloxy group, a carboxy group, an ether bond, and an ester bond. For striking a balance between electrical resistance and sliding durability, a hydroxyl group or a thiol group is preferable, with a hydroxyl group being more preferable.

The specified oil may have any number of polar groups, which is for example one, but not particularly limited thereto, and may be two or more. In particular, the number of polar groups is preferably 1 to 4, and more preferably 1, for striking a balance between low electrical resistance and sliding durability.

The position of the polar group in the specified oil is not limited in particular. For striking a balance between low electrical resistance and sliding durability, the specified oil has a polar group preferably at the end of a chain.

The specified oil may have a straight chain, or a branched chain. The fluorinated oil may also include a cyclic structure.

The specified oil includes a skeleton containing a fluorine atom such as a fluorocarbon skeleton, a perfluoropolyether skeleton, a fluorine-modified silicone skeleton, and a fluoroester skeleton, in addition to a polar group.

A perfluoroether skeleton is a skeleton configured with a repeating unit represented by Formula (A).

—(OL$^1$)—  Formula (A)

L$^1$ represents a perfluoroalkylene group. The perfluoroalkylene group preferably contains 1 to 10, more preferably 2 to 6, and even more preferably 2 to 3 carbon atoms.

Examples of preferable specified oils include a compound represented by Formula (1), and a compound represented by Formula (2).

(R$^f$—(OL$^1$))$_n$—L$^2$—(R$^1$)$_m$  Formula (1)

(R$^2$—L$^2$—(R$^1$))$_m$  Formula (2)

L$^1$ in Formula (1) is as defined above.

The letter n represents an integer of 2 or more. In particular, n is preferably 3 to 20, and more preferably 3 to 6, for striking a balance between low electrical resistance and sliding durability.

L$^2$ in Formula (1) represents an (m+1)-valent aliphatic hydrocarbon group. For example, when m=1, L$^2$ represents a divalent aliphatic hydrocarbon group, and when m=2, L$^2$ represents a trivalent aliphatic hydrocarbon group. The number of carbon atoms in the aliphatic hydrocarbon group is not limited in particular. Preferably, the aliphatic hydrocarbon group contains 1 to 10, more preferably 1 to 6, and even more preferably 1 to 3 carbon atoms.

R$^f$ in Formula (1) represents a perfluoroalkyl group. The perfluoroalkyl group preferably contains 1 to 5, and more preferably 2 to 4 carbon atoms.

R$^1$ in Formula (1) represents a polar group. Preferable examples of polar groups are as listed above.

The letter m in Formula (1) represents an integer of 1 or more. In particular, m is preferably 1 to 4, and more preferably 1 to 2, for striking a balance between low electrical resistance and sliding durability.

R$^2$ in Formula (2) represents a perfluoroalkyl group. The number of carbon atoms in the perfluoroalkyl group is not limited in particular. Preferably, the perfluoroalkyl group contains 4 to 20, more preferably 5 to 15, and even more preferably 6 to 12 carbon atoms.

The definitions of L$^2$, R$^1$, and m in Formula (2) are the same as the definitions of respective groups in Formula (1).

Examples of specified oils include, for example, 1H,1H-heptadecafluoro-1-nonanol, 1H,1H,10H,10H-hexadecafluoro-1,10-decanediol, 1H,1H-perfluoro-3,6,9-trioxadecan-1-ol, 1H,1H,11H,11H-dodecafluoro-3,6,9-trioxaundecane-1,11-diol, 1H,1H,2H,2H-perfluorodecan-1-ol, 3,5-bis(trifluoromethyl)benzen-1-ol, 1H,1H-perfluoro(2,5,8,11,14-pentamethyl-3,6,9,12,15-oxaoctadecan-1-ol), 1H,1H,2H,2H-perfluorodecanethiol, and 3,5-bis(trifluoromethyl)benzenethiol.

Commercially available products may also be used as the specified oil. Commercially available products include, for example, MORESCO PHOSFAROL A-20H (manufactured by MORESCO Corporation), DEMNUM (registered trademark) S-65 (manufactured by DAIKIN Industries, Ltd.), and FOMBLIN (registered trademark) ZDOL (manufactured by Solvay).

The specified oil content in the coating is preferably, but not particularly limited to, 50 mass to 99 mass %, and more preferably 60 to 97 mass % relative to the total mass of the coating, for striking a balance between low electrical resistance and sliding durability.

One type of specified oil may be used alone, or two or more types may be used in combination.

Metal Particles Surface-Treated with a Fluorine-based Compound Having a Polar Group The coating contains metal particles surface-treated with a fluorine-based compound having a polar group (hereinafter also referred to simply as "specified metal particles").

The specified metal particles in the coating serve as an electrical contact.

Metal particles in the specified metal particles have an average aspect ratio (length of long axis/length of short axis) of 30 or less. In particular, metal particles have an average aspect ratio of preferably 15 or less, and more preferably 1 or less. The lower limit thereof is not limited in particular but mostly 1 or more.

The average aspect ratio of the specified metal particles is determined by analyzing the particle shape of 20 or more specified metal particles with an electron microscope, determining the aspect ratio (length of long axis/length of short axis) of each particle by the procedures described below, and taking the median (the value of D(50)) of the distribution of such ratios as the average aspect ratio.

FIG. 1 is a diagram showing a specified metal particle having a spheroidal shape. In this case, the length a$_1$ of the long axis and the length b$_1$ of the short axis passing the middle of the long axis are measured, the ratio between a$_1$ and b$_1$ (a$_1$/b$_1$) is determined as the aspect ratio, and the median (the value of D(50)) of the distribution of such ratios is taken as the average aspect ratio. The shape of a particle of FIG. 1 is to be a perfect sphere when the aspect ratio is 1.

Figure 2A:
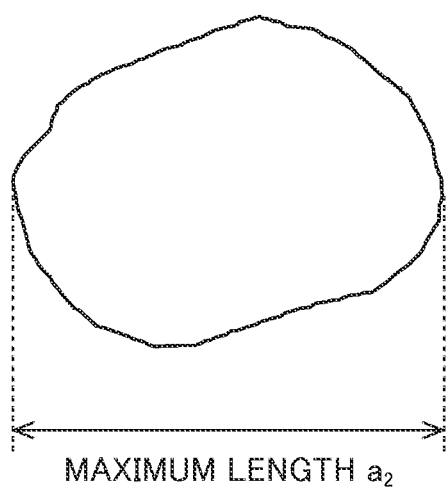
FIGS. 2A and 2B are diagrams showing a specified metal particle having a flake shape, with FIG. 2A being a plan view and FIG. 2B being a perspective view.
Figure 2B:
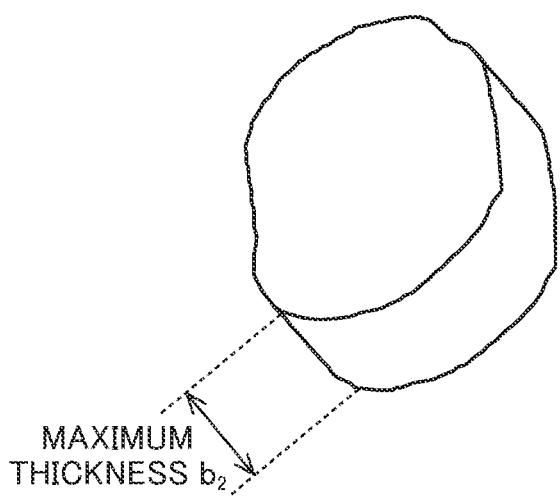

FIG. 2 is a diagram showing a specified metal particle having a flake shape, with FIG. 2(a) being a plan view and FIG. 2(b) being a perspective view. As shown in FIG. 2(a), the maximum length $a_2$ is measured for the plane part. As shown in FIG. 2(b), the maximum thickness $b_2$ is measured for the lateral part. Particles that allow observation of both the plane part and the lateral part are selected, the ratio between $a_2$ and $b_2$ ($a_2/b_2$) is determined as the aspect ratio, and the median (the value of D(50)) of the distribution of such ratios is taken as the average aspect ratio.

For a particle of flake shape herein, the maximum length of the plane part is defined as the "length of the long axis" and the maximum thickness of the lateral part as the "length of the short axis."

The metals in the specified metal particles are not limited to a particular metal and may be any of known metals such as silver, gold, copper, tin, and nickel. In particular, for striking a balance between low electrical resistance and sliding durability, the metal of the metal base described above is preferably the same as the metal of the specified metal particles.

In the case where the metal base has a plating layer, the metal forming the plating layer is preferably the same as the metal of the specified metal particles.

The specified metal particles contain a fluorine-based compound having a polar group (hereinafter also referred to simply as "specified compound"). The specified compound functions as a surface modifier of the metal particles.

The specified compound contains a polar group that may be, but not limited particularly to, one of the examples of polar groups of the specified oil listed above.

The specified compound is not limited to a particular compound as long as it contains a polar group and a fluorine atom. In particular, the specified oils listed above are preferable for striking a balance between low electrical resistance and sliding durability.

The specified metal particles have an average primary particle size that is not limited in particular but preferably 0.2 μm to 10.0 μm, and more preferably 0.5 μm to 2.0 μm, for striking a balance between low electrical resistance and sliding durability.

The average primary particle size of the specified metal particles is an arithmetic average value obtained by measuring the diameters (particle sizes) of 20 or more specified metal particles using an electron microscope. For any of the observed specified metal particles that are not an exact circle, the length of the long axis is measured as the diameter.

The specified metal particles in the coating have an average secondary particle size that is mostly, but not particularly limited to, 0.2 μm to 10.0 μm, and preferably 1.7 μm to 2.1 μm for striking a balance between low electrical resistance and sliding durability.

The average secondary particle size of the specified metal particles in the coating is an arithmetic average value obtained by measuring the diameters (secondary particle sizes) of 20 aggregates of specified metal particles observed when the coating is observed using a polarizing microscope from a normal direction of the coating. For any of the observed aggregates of specified metal particles that are not an exact circle, the length of the long axis is measured as the diameter.

While the above method obtains an average secondary particle size from 20 aggregates of specified metal particles, the specified metal particles in the same coating are not expected to produce a significant difference in the average secondary particle size.

The specified metal particle content in the coating is preferably, but not particularly limited to, 0.01 to 50 mass %, and more preferably 3 to 40 mass % relative to the total mass of the coating, for striking a balance between low electrical resistance and sliding durability.

One type of specified metal particles may be used alone, or two or more types may be used in combination.

The ratio of the specified oil content (mass %) to the specified metal particle content (mass %) (specified oil content (mass %)/specified metal particle content (mass %)) is, in most cases, but not particularly limited to, 1 to 1000, preferably 10 to 30, and more preferably 15 to 25, for striking a balance between low electrical resistance and sliding durability.

The ratio of the average secondary particle size (μm) of the specified metal particles to the maximum height Ry (μm) of the surface roughness of the metal base mentioned above (average secondary particle size (μm) of specified metal particles/maximum height Ry (μm) of surface roughness of metal base) is, in most cases, but not particularly limited to, 0.1 to 2.0, and preferably 1.0 to 1.2 for striking a balance between low electrical resistance and sliding durability.

The ratio of the area of the specified metal particles to the area of the coating as observed from a normal direction of the coating is in most cases, but not particularly limited to, 0.1% to 50.0%, preferably 0.6% to 30.2%, and more preferably 3.6% to 15.0%, for striking a balance between low electrical resistance and sliding durability.

The ratio of the area of the specified metal particles to the area of the coating is intended to mean a ratio of an area taken up by specified metal particles to an area of coating in an observed region when the coating is observed using a polarizing microscope from a normal direction of the coating. The polarizing microscope has an observation area of 0.11 cm×0.07 cm, and the ratio of the area of the specified metal particles to the area of the coating is an average value of the ratios obtained by the observation at five or more random points of the coating. Some parts of the area taken up by the specified metal particles may include aggregates of the specified metal particles.

While the above method obtains a ratio of an area of specified metal particles to an area of coating by observation at five or more random points of the coating, the same coating is not expected to produce a significant difference in the ratio of the area of specified metal particles to the area of coating.

The method for producing the specified metal particles is not limited to a particular one and may be any of known methods.

For example, specified metal particles may be produced by mixing a specified compound and metal particles in the presence of a solvent.

In the case where a specified compound and metal particles are mixed such that the specified compound remains in excess in the solution produced as above, the solution thus obtained can be used as a composition for use in producing the contact member to be described later.

Method for Producing Contact Member

The method for producing the contact member is not limited to a particular one and may be any of known methods.

Supplying a composition that contains a specified oil and specified metal particles onto a metal base is one example of a highly productive method of forming a coating.

The composition is designed for forming the coating and contains the specified oil and specified metal particles described above.

The specified oil content in the composition is preferably, but not particularly limited to, 1.0 to 3.0 massa, and more preferably 1.5 to 2.5 mass % relative to the total mass of the composition, for striking a balance between low electrical resistance and sliding durability.

The content of specified metal particles in the composition is preferably, but not particularly limited to, 0.001 to 1 mass %, and more preferably 0.1 to 0.5 mass % relative to the total mass of the composition, for striking a balance between low electrical resistance and sliding durability.

The ratio of the specified oil content (mass %) to the specified metal particle content (mass %) in the composition (specified oil content (mass %)/specified metal particle content (mass %)) is not limited in particular and is preferably in the range of the ratio in the coating specified above.

The composition may contain a solvent.

Examples of the solvent include, but not particularly limited to, an alcohol-based solvent, an ester-based solvent, a ketone-based solvent, an aliphatic hydrocarbon-based solvent, an alicyclic or aromatic hydrocarbon-based solvent, a halogenated hydrocarbon-based solvent, and a fluorine-based solvent.

The solvent content in the composition is preferably, but not particularly limited to, 50 to 99.9 mass %, and more preferably 80 to 99 mass % relative to the total mass of the composition, for striking a balance between low electrical resistance and sliding durability.

One type of solvent may be used alone, or two or more types may be used in combination.

The composition may be supplied onto the metal base by any method such as, but not particularly limited to, applying the composition on the metal base, or immersing the metal base in the composition.

After supplying the composition on the metal base, a drying process may be carried out as required for evaporation of the solvent. Alternatively, the metal base may be naturally dried to let the solvent evaporate.

Presumed Mechanism

While the mechanism in the contact member of the present invention whereby the desired effect is achieved is not clear, a presumed mechanism is described using FIGS. 3A and 3B.

FIG. 3A and FIG. 3B are schematic diagrams for describing a presumed mechanism of the contact member of the present invention. FIG. 3A and FIG. 3B show a case where a metal base 11 has a predetermined roughness. In the illustrated case, a specified oil, i.e., fluorinated oil having a polar group, is used for the surface treatment of metal particles 14.

A coating 12 is formed on a surface of the metal base 11 of a contact member 10 of the present invention. More specifically, the molecules of the fluorinated oil 15 having a polar group bond together and form a monomolecular layer on the surface of the metal base 11. On the top of this monomolecular layer, there is formed a fluidized layer of the fluorinated oil 15 that is loosely retained by entanglement of molecular chains. The metal particles 14, with the fluorinated oil 15 bonded to their surfaces by a surface treatment, are dispersed in this fluidized layer. Namely, the coating 12 includes the monomolecular layer and the fluidized layer.

Adhesion occurs when the metal particles 14 dispersed in the fluidized layer of the fluorinated oil 15 are pressed against a surface of the metal base 11 by a terminal 100 and deformed, which establishes electrical connection. Low electrical resistance is thus achieved.

The unit of the adhesion is as low as or lower than that of the metal particle 14 because of the presence of the fluorinated oil 15 around each metal particle 14. Since the adhesion points are very small and distributed, the adhered metals readily separate by application of a small stress. Therefore, while adhesion occurs, it does not develop to cause wear. Sliding durability is thus achieved.

The adhesion as above results from deformation of the metal particles 14, which is found to be derived from "cracking" of the metal particles. The ease of occurrence of the cracking is described below.

When a stress is applied to a metal particle 14, the metal particle 14 is firstly rotated or moved such that the long axis thereof lies parallel to the metal base because it is easy for the metal particle 14 to rotate or move at the initial stage of the application of the stress. Thus, cracking caused by concentration of stress occurs at a position of high curvature in the metal particle 14.

Accordingly, it is most important to reduce positions of high curvature in the metal particle 14 in order to efficiently generate cracks under the condition of load as low as about 0.1 N. In terms of the particle shape, the ideal shape is spherical.

For the foregoing reason, it is preferable that metal particles in the specified metal particles have a low aspect ratio (length of long axis/length of short axis). Therefore, metal particles in the specified metal particles have an average aspect ratio of 30 or less.

In cases where, for instance, a conductive adhesive is used at a contact interface, a sphere or flake shape has been employed as the shape of conductive particles. Threebond Technical News 52 (Issued on Jan. 1, 1999) describes a recent technology trend of conductive adhesives. According to this, spherical particles with a low aspect ratio tend to have high electrical resistance due to their point contact, while particles of flake shape with a high aspect ratio tend to have low electrical resistance due to their surface contact.

In contrast, metal particles in the specified metal particles in the present invention have a low aspect ratio (length of long axis/length of short axis) as described above, which leads to low contact resistance under the condition of load as low as about 0.1 N.

When the metal particles 14 come to a state where they are embedded in the metal base 11 as shown in FIG. 3B, this allows the fluorinated oil 15 to be retained inside the metal base 11, letting the oil appear on the surface of the metal base 11 again and function as the fluidized layer when the terminal 100 slides. In this way, the metal particles 14 carrying the fluorinated oil 15 bonded to their surfaces function as a new supply mechanism that prevents shortage of lubricant in a place where sliding is carried out and that allows repeated use of the lubricant.

Applications

The contact member of the present invention is applicable to various uses.

The contact member of the present invention may for example be applied to an electronic component or an electrical device used for turning on and off the current to a switch or a relay. Namely, the present invention also relates to a connector having the contact member.

In usage, the contact members of the present invention may be used such as to slide on each other with their coatings facing each other.

Figure 4:
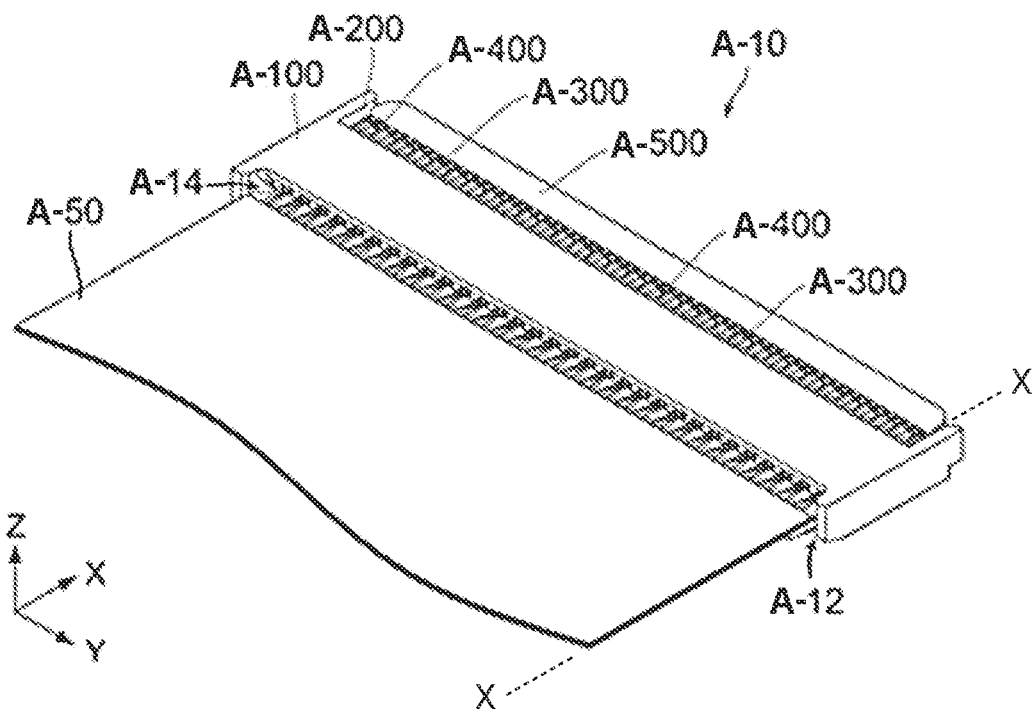
FIG. 4 is a perspective view showing one example of configuration of a connector. A flexible printed circuit (FPC) of a connection object is inserted in the illustrated connector.
Figure 5:
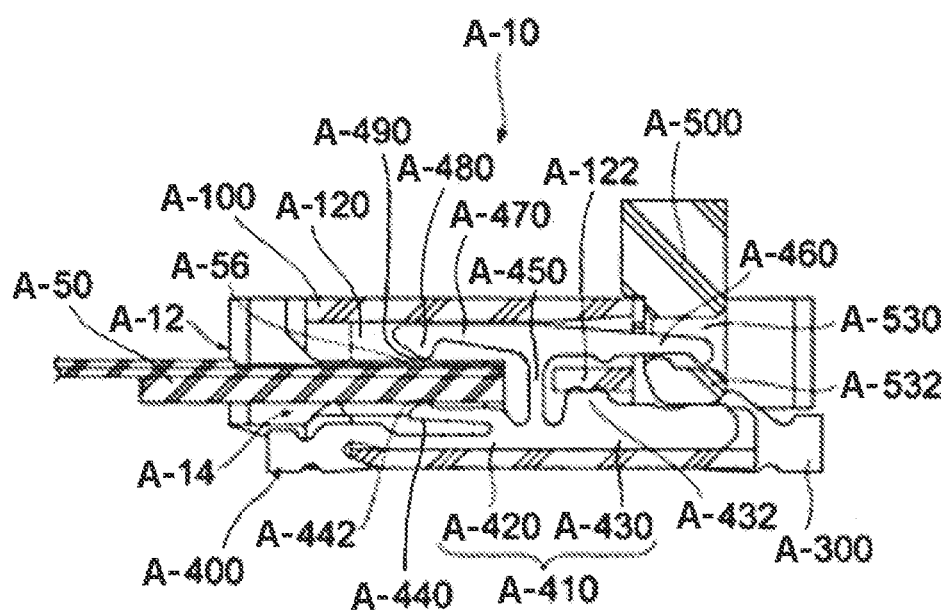
FIG. 5 is a cross-sectional view of the connector of FIG. 4 taken along line x-x.

The contact member of the present invention is favorably applied to connectors used under the condition of load as low as about 0.1 N. FIG. 4 is a perspective view showing one example of configuration of a connector to be used under the condition of load as low as about 0.1 N. A flexible printed circuit (FPC) A-50 that is a connection object is inserted in a connector A-10 as illustrated. FIG. 5 is a cross-sectional view of the connector A-10 of FIG. 4 taken along line x-x. The particulars of the connector A-10 of FIGS. 4 and 5 are described in JP 2013-258158 A. In the connector A-10 of FIGS. 4 and 5, A-12 represents a front end, A-14 a receiving part, A-100 a housing, A-120 a second retaining part, A-122 a second press-fitted part, A-200 a retaining member, A-300 a first signal contact (signal contact), A-400 a second signal contact, A-410 a base, A-420 a front lateral base part, A-430 a rear lateral base part, A-432 a press-fitting part, A-440 an opposite support, A-442 an opposite contact part, A-450 a rising part, A-460 a pressed part, A-470 a support, A-480 a projection, A-490 a contact part, and A-500 an actuator. In the FPC A-50 in FIG. 5, A-56 represents a terminal. When the contact member of the invention is applied to the connector A-10 of FIGS. 4 and 5, a coating may be formed on surfaces of the projection A-480 and the opposite contact part A-442 that are connection parts of the terminal A-56 of the FPC A-50 by application of or immersion in the composition above.

Figure 6:
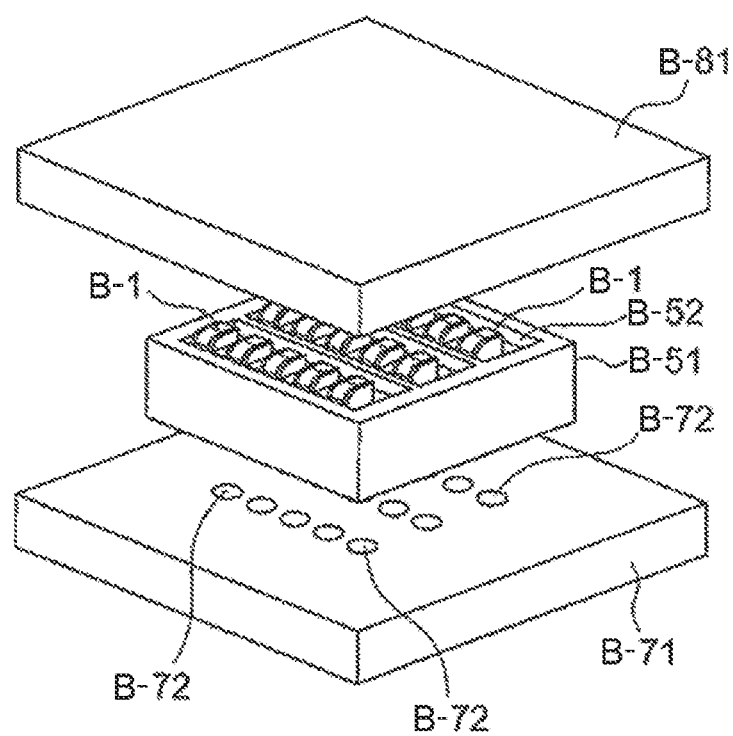
FIG. 6 is a diagram showing another example of configuration of a connector. The illustrated connector is a connector structure composed of a connector and a frame retaining the connector, and the diagram is a perspective view showing a connection object using the connector structure and a counter connection object before those objects are connected.
Figure 7:
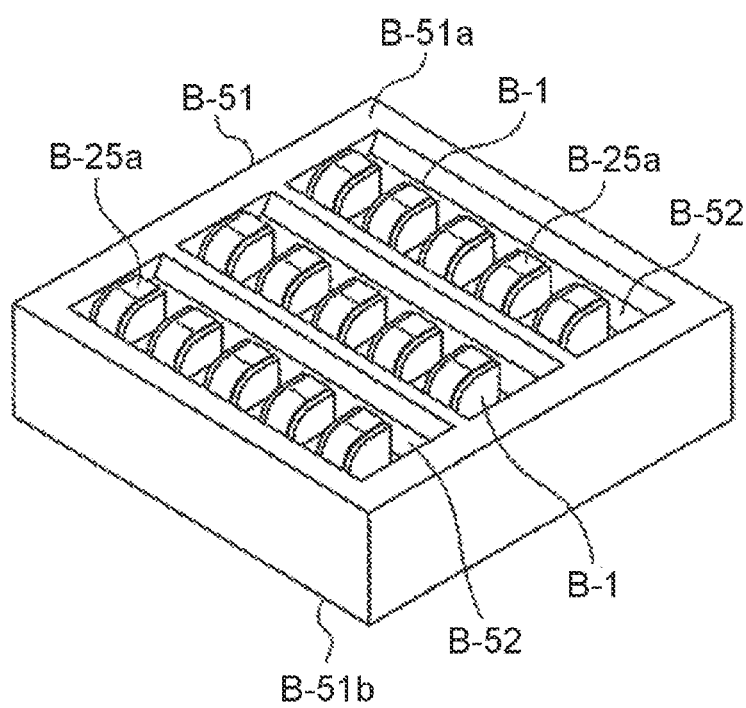
FIG. 7 is a perspective view showing the connector structure of FIG. 6.
Figure 8:
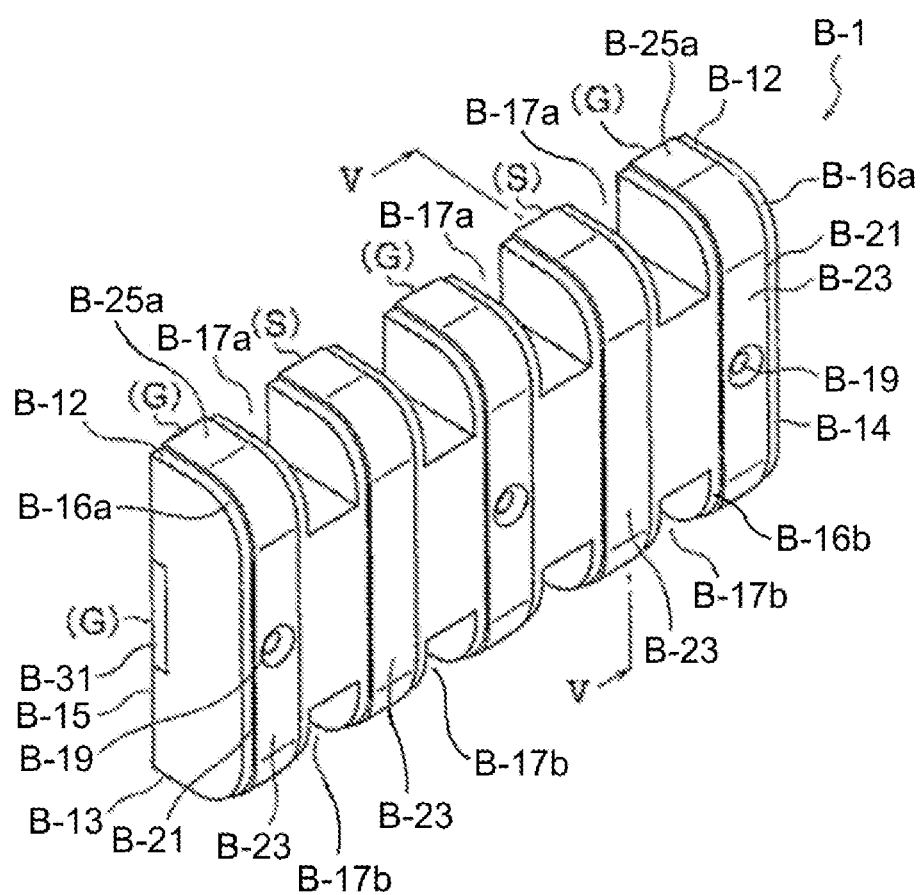
FIG. 8 is a perspective view showing the connector of FIG. 7.
Figure 9:
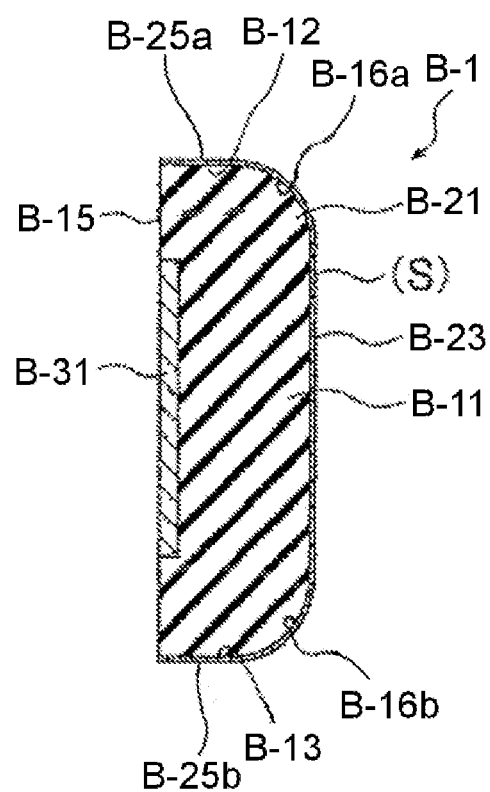
FIG. 9 is a cross-sectional view of the connector of FIG. 8 taken along line V-V.

FIG. 6 is a diagram showing another example of configuration of a connector to be used under the condition of load as low as about 0.1 N. A connector B-1 as illustrated is a connector structure composed of a connector and a frame B-5 retaining the connector B-1, and the diagram is a perspective view showing a connection object using the connector structure and a counter connection object before being connected. FIG. 7 is a perspective view showing the connector structure of FIG. 6. FIG. 8 is a perspective view showing the connector B-1 of FIG. 7. FIG. 9 is a cross-sectional view of the connector B-1 of FIG. 8 taken along line V-V. The particulars of the connector B-1 of FIGS. 6 to 9 are described in JP 2009-176474 A. In the connector B-1 of FIGS. 6 to 9, B-11 represents an elastic body, B-12 a first surface, B-13 a second surface, B-14 a third surface, B-15 a fourth surface, B-16a and B-16b curved surfaces, B-17a and B-17b grooves, B-19 a hole, B-21 a conductor pattern, B-21(G) a conductor pattern as a ground line, B-21(S) a conductor pattern as a signal line, B-23 a transmission path, B-25a a first electrode, B-25b a second electrode, B-31 a metal beam, B-51 a frame, B-52 a retaining part, B-71 a substrate, B-72 a conductive part, and B-81 a substrate. When the contact member of the invention is applied to the connector B-i of FIGS. 6 to 9, a coating may be formed on surfaces of the first electrode B-25a and the second electrode B-25b that are connection parts of a terminal by application of or immersion in the composition above.

Figure 10:
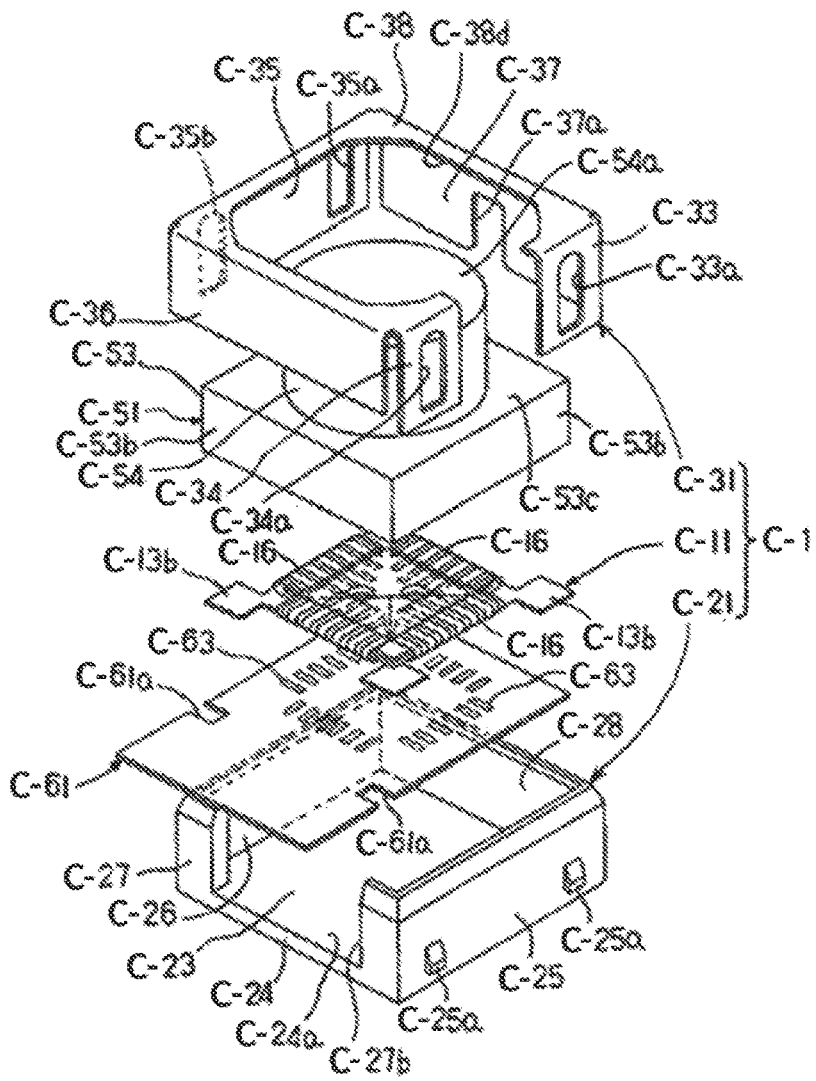
FIG. 10 is a diagram showing still another example of configuration of a connector. The connector is accommodated in a socket. This diagram is a perspective view showing, in an exploded state, the socket as well as a first connection object and a second connection object that are connected by a composition.
Figure 11:
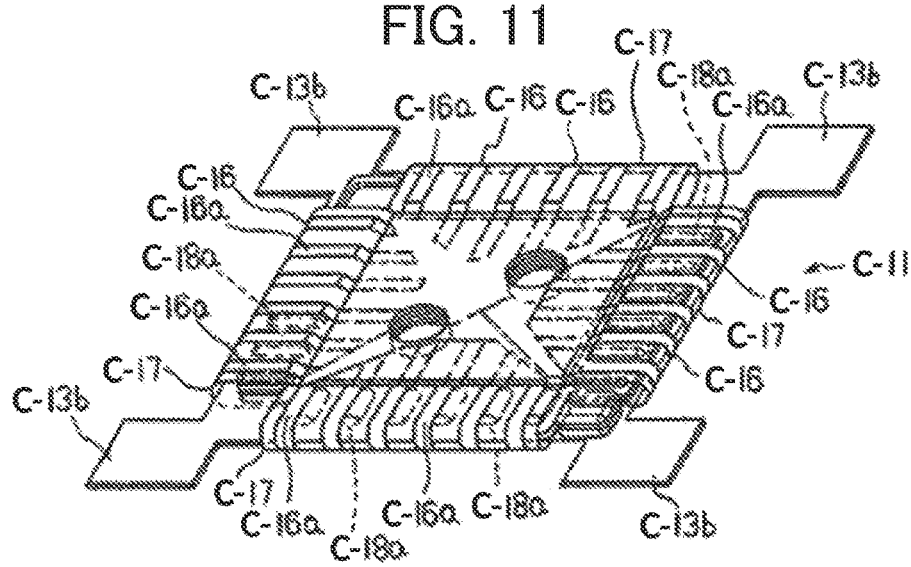
FIG. 11 is an enlarged perspective view of the connector shown in FIG. 10.
Figure 12:
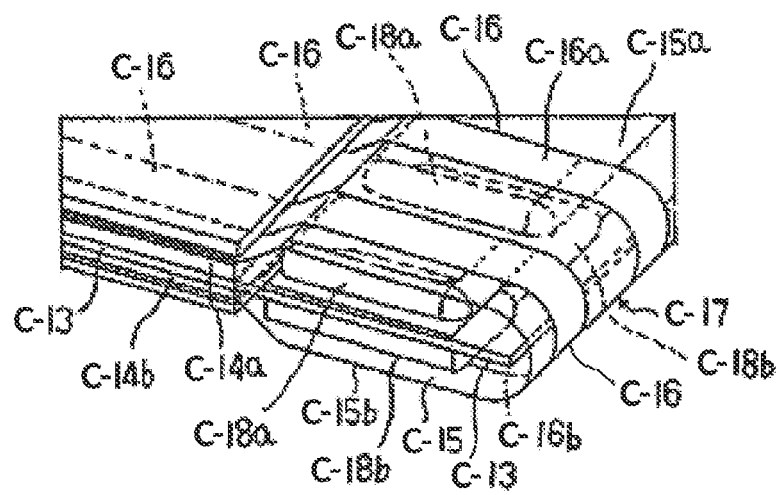
FIG. 12 is an enlarged cross-sectional view of a part of the connector shown in FIG. 11.

FIG. 10 is a diagram showing still another example of configuration of a connector to be used under the condition of load as low as about 0.1 N. A connector C-11 is accommodated in a socket C-1. This diagram is a perspective view showing, in an exploded state, the socket C-1 as well as a first connection object C-51 and a second connection object C-61 that are connected by the socket C-1. FIG. 11 is an enlarged perspective view of the connector C-11 shown in FIG. 10. FIG. 12 is an enlarged cross-sectional view of a part of the connector C-11 shown in FIG. 11. The particulars of the connector C-11 of FIGS. 10 to 12 are described in JP 2008-108453 A. In C-1 and the connector C-11 of FIGS. 10 to 12, C-13 represents a base film, C-13b a connector positioning part, C-14a and C-14b adhesive members, C-15 a film, C-15a a first surface, C-15b a second surface, C-16 a conductor, C-16a a first connection part, C-16b a second connection part, C-17 an electrode part, C-18a and C-18b elastic bodies, C-21 a base member, C-23 a base accommodating part, C-24 a base part, C-24a one surface, C-25 a first lateral wall part, C-25a and C-26a locking parts, C-26 a second lateral wall part, C-27 a third lateral wall part, C-28 a fourth lateral wall part, C-31 a cover member, C-33 and C-34 first lateral plate parts, C-33a, C-34a, C-35a, and C-35b locked parts, C-35 a second lateral plate part, C-36 a third lateral plate part, C-37 a fourth lateral plate part, C-37a a guided part, and C-38 a top panel part. In the first connection object C-51 of FIGS. 10 to 12, C-53 represents a main body, and C-54 a mounting part. In the second connection object C-61 of FIGS. 10 to 12, C-61a represents a cut-out part, and C-63 a connection part. When the contact member of the invention is applied to the connector C-11 of FIGS. 10 to 12, a coating may be formed on surfaces of the first connection part C-16a and the second connection part C-16b that are connection parts of a terminal by application of or immersion in the composition above.

Figure 13:
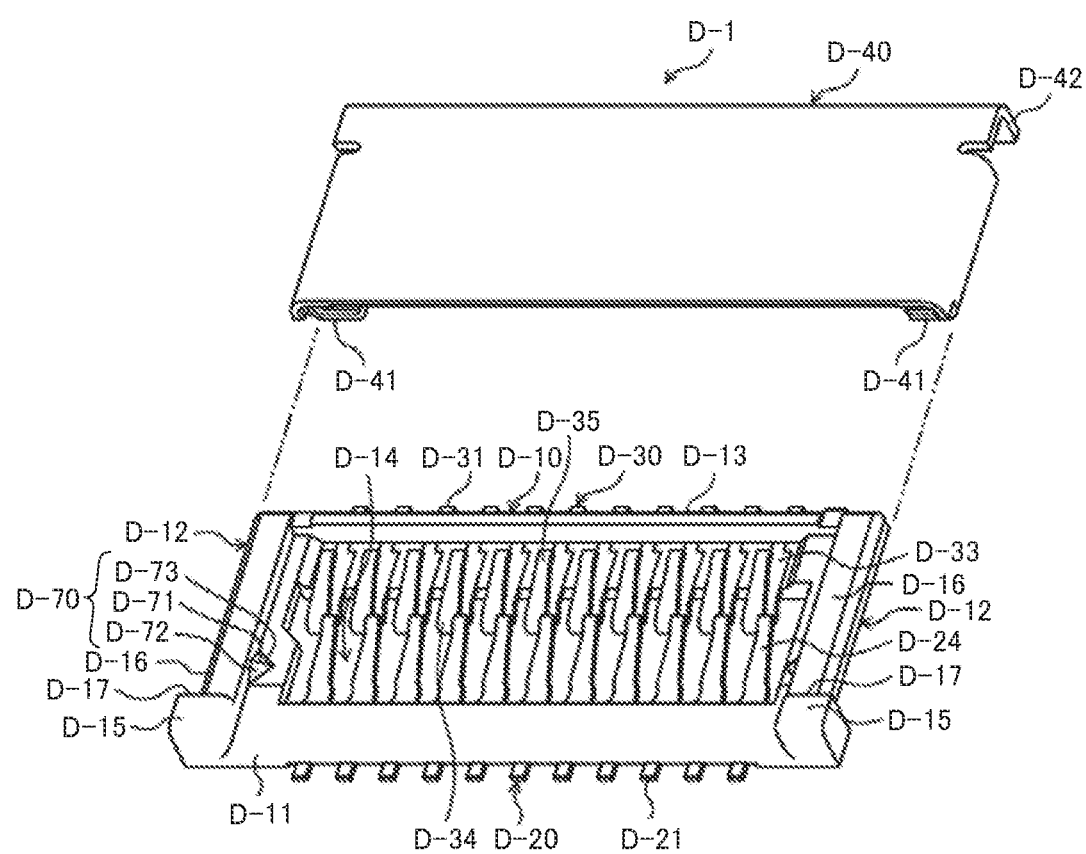
FIG. 13 is an exploded perspective view showing still another example of configuration of a connector.
Figure 14:
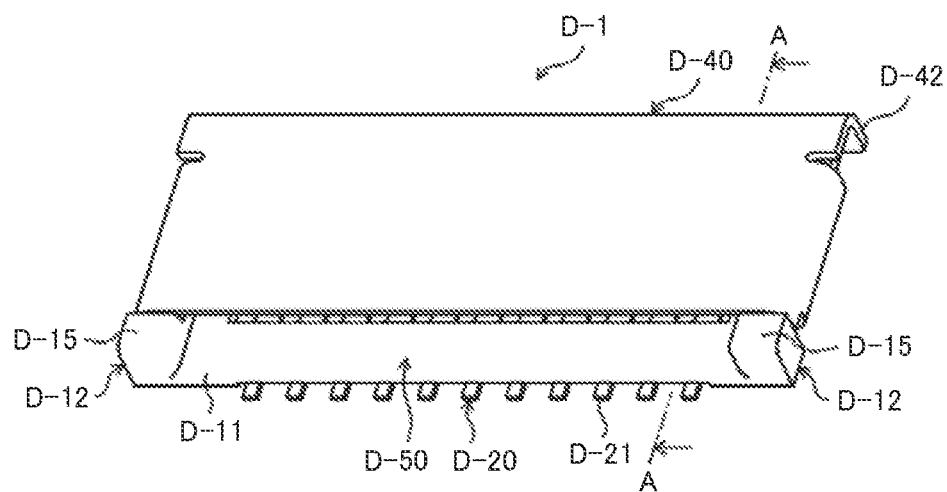
FIG. 14 is a perspective view of the connector of FIG. 13.
Figure 15:
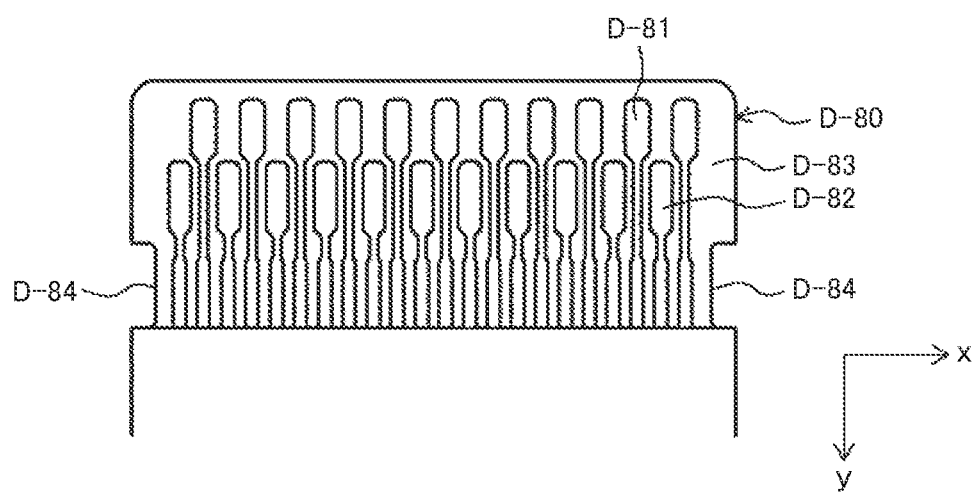
FIG. 15 is a plan view of the FPC inserted into the connector of FIG. 13.
Figure 16:
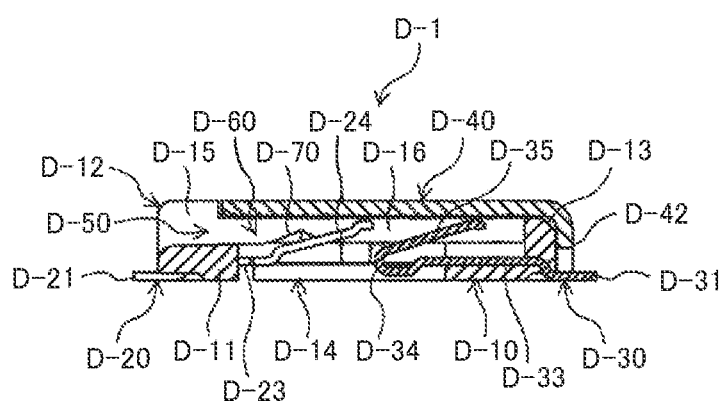
FIG. 16 is a cross-sectional view of the connector of FIG. 13 taken along line A-A.

FIG. 13 is an exploded perspective view showing still another example of configuration of a connector to be used under the condition of load as low as about 0.1 N. FIG. 14 is a perspective view of a connector D-1 for flexible printed circuit (FPC) connection shown in FIG. 13. FIG. 15 is a plan view of an FPC D-80 inserted into the connector D-1 of FIG. 13. FIG. 16 is a cross-sectional view of the connector D-1 of FIG. 13 taken along line A-A. The particulars of the connector D-1 for flexible printed circuit (FPC) connection of FIGS. 13 to 16 are described in JP 2015-204227 A. In the connector D-1 of FIGS. 13 to 16, D-10 represents a housing, D-11 a bottom part, D-12 a lateral wall part, D-13 a rear wall, D-14 a through-hole, D-15 a front end part, D-16 a guide part, D-17 a stop part, D-20 a contact, D-21 a terminal part, D-23 a fixing part, D-24 a connection part, D-30 a contact, D-31 a terminal part, D-33 an extension part, D-34 a folding part, D-35 a connection part, D-40 a cover, D-41 a locking part, D-42 an abutment part, D-50 an opening, D-60 an insertion hole, D-70 a projection, D-71 a ridge part, D-72 a slope part, and D-73 a slope part. In the FPC D-80 of FIGS. 13 to 16, D-81 represents a connection part, D-82 a connection part, D-83 an insulating part, and D-84 an engagement recess part. When the contact member of the invention is applied to the connector D-1 of FIGS. 13 to 16, a coating may be formed on surfaces of the connection parts D-24 and D-35 that are connection parts of a terminal by application of or immersion in the composition above.

EXAMPLES

The present invention is described in more specific terms below using Examples, without any intention of limiting the present invention to the examples. In the description of Examples, metals may be indicated by element symbols instead of names, for example Ag for silver and Cu for copper.

Preparation of Composition

Materials Used

The compositions listed in the following tables contain the following components.

Fluorine-Based Solvent

Vertrel XF (product name, manufactured by Chemours-Mitsui Fluoroproducts Co., Ltd.) containing a compound of the following formula.

[Chemical Formula 1]

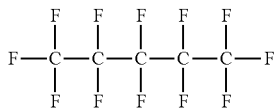

Fluorinated Oil Having a Polar Group (Specified Oil)

1H,1H-Perfluoro(2,5,8,11,14-pentamethyl-3,6,9,12,15-oxaoctadecan-1-ol) (following formula)

[Chemical Formula 2]

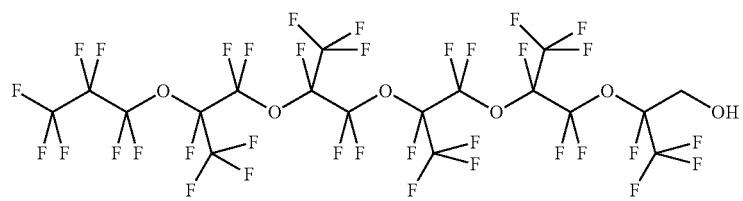

Metal Particles

Silver particles 1 (flake shape): Silbest reduction silver G-1 (manufactured by Tokuriki Honten, Co., Ltd.) was pulverized using a ball mill and classified with Turbo Classifier (manufactured by Nisshin Engineering Inc.).

Silver particles 2 (flake shape): Silbest reduction silver G-1 (manufactured by Tokuriki Honten, Co., Ltd.) was pulverized using a ball mill under conditions different from those in manufacture of Silver particles 1 and classified with Turbo Classifier (manufactured by Nisshin Engineering Inc.) under conditions different from those in manufacture of Silver particles 1.

Silver particles 3 (flake shape): YFS-02 (commercial name) (manufactured by YAMAKIN Co., Ltd.)

Silver particles 4 (spheroidal shape): Silbest reduction silver G-1 (commercial name) (manufactured by Tokuriki Honten, Co., Ltd.)

The aspect ratio of silver particles was calculated by observing the silver particles with an electron microscope (JSM-6301F, manufactured by JEOL Ltd.) in a field of view at 2,000× to 50,000× and analyzing the particle shape.

For each type of Silver particles 1 to 3 having a flake shape (see FIG. 2), 50 particles allowing observation of both the plane part and the lateral part were selected in the observation field of view; the maximum length $a_2$ was measured for the plane part as shown in FIG. 2(*a*), and the maximum thickness $b_2$ was measured for the lateral part as shown in FIG. 2(*b*); the ratio between $a_2$ and $b_2$ ($a_2/b_2$) was calculated; and the median (the value of D(50)) of the distribution of such ratios was taken as the average aspect ratio. Silver particles 1 have an average aspect ratio of 50 (average maximum length $a_2$: 5.1 μm); Silver particles 2 have an average aspect ratio of 30 (average maximum length $a_2$: 4.8 μm); and Silver particles 3 have an average aspect ratio of 15 (average maximum length $a_2$: 3.9 μm).

For Silver particles 4 having a spheroidal shape (see FIG. 1), the length a1 of the long axis and the length b1 of the short axis passing the middle of the long axis were measured for each of 50 particles in the observation field of view, the ratio between $a_1$ and $b_1$ ($a_1/b_1$) was calculated as the aspect ratio, and the median (the value of D(50)) of the distribution of such ratios was taken as the average aspect ratio. Silver particles 4 have an average aspect ratio of 1 (average length $a_1$ of long axis: 4.2 μm). Thus, the particle shape of Silver particles 4 is a perfect sphere.

Types of Compositions

Compositions were prepared by mixing the above components in proportions listed in Table 1 shown below. Each composition contains a specified oil and metal particles that interact with each other and form the specified metal particles described above, while part of the specified oil remains as is in the composition. Namely, the obtained Compositions 1 to 4 contained specified oil and specified metal particles. The obtained compositions 1 to 4 each contain silver particles as shown in Table 2.

TABLE 1

| Component | Composition (unit: mass %) | | | |
| --- | --- | --- | --- | --- |
| | 1 | 2 | 3 | 4 |
| Silver particles | 1 | 1 | 1 | 1 |
| 1H,1H-perfluoro(2,5,8, 11,14-pentamethyl-3,6,9, 12,15-oxaoctadecan-1-ol) | 2 | 2 | 2 | 2 |
| Vertrel XF | 97 | 97 | 97 | 97 |
| Total | 100 | 100 | 100 | 100 |

TABLE 2

| Component | Composition | | | |
| --- | --- | --- | --- | --- |
| | 1 | 2 | 3 | 4 |
| Silver particles (type) | 1 | 2 | 3 | 4 |
| Silver particles (average aspect ratio) | 50 | 30 | 15 | 1 |

Production of Contact Member

For production of samples to be used in an evaluation test (sliding test), the following probe and plate were prepared.

Probe: Pin Probe

Contact shape: Spherical with 1 mm radius of curvature
Base material: C1100 (tough pitch copper)

Plating type: Soft Ag plating
Plating thickness: 5 μm

Plate: Test Piece

Base material: C1100 (tough pitch copper)
Plating type: Soft Ag plating
Plating thickness: 5 μm Next, using the compositions produced as described above, the probes and the plates were coated by dipping with each type of compositions. After the coating, the probes and the plates were let dry naturally at normal temperature for one hour, and thus probes having a predetermined coating and plates having a predetermined coating were prepared.

These probes and plates prepared as described above correspond to the contact member.

Evaluation (1) Sliding Test

Evaluation Procedure

The probe having the predetermined coating was rubbed on the plate having the predetermined coating prepared as described above, and the friction coefficient and the contact resistance were measured using a measurement device and in measurement conditions described below. The contact resistance was measured both at the start of sliding and during sliding. The friction coefficient is a friction coefficient measured during sliding.

A real-time observation was conducted simultaneously using a CCD camera, and the test was finished at a time point when exposure of a surface of Cu that is the base material was detected.

Measurement Device

Friction and wear tester with simultaneous measurement of electrical contact resistance FPR-2300 (RHESCA Co., Ltd.) 0024

Measurement Conditions

Sliding distance: 10 mm
Sliding speed: 10 mm/s
Contact load: 0.1 N
Number of cycles: Test ended when exposure of Cu surface was detected Evaluation Criteria The test conducted as above was followed by evaluation of the following three categories (1) to (3).
  (1) Contact resistance at 0.1 N contact load (during sliding)
  (2) Friction coefficient at 0.1 N contact load (during sliding)
  (3) Number of sliding cycles at 0.1 N contact load until a Cu surface becomes exposed For each of the above (1) to (3) categories, it is judged that a desired effect is achieved when the reference value in Table 3 shown below is satisfied. For the contact resistance at 0.1 N contact load (during sliding), for example, if it is less than 2.0 mΩ, it is judged that the desired effect is achieved.

TABLE 3

| Evaluation category | Reference value |
| --- | --- |
| (1) Contact resistance at 0.1N contact load (during sliding) (mΩ) | Less than 5.0 |
| (2) Friction coefficient at 0.1N contact load (during sliding) | Less than 2.0 |
| (3) Number of sliding cycles at 0.1N contact load until a Cu surface becomes exposed (cycles) | More than 10 |

In the row "Effect" in Table 5 shown below, "good" represents a case that satisfies the reference values in all of the above evaluation categories, and "excellent" represents a case with particularly good characteristics among these.

"Poor" represents a case that fails to satisfy a reference value even in one of the above evaluation categories.

(2) Load-Contact Resistance Test (W-R test)

Figure 17:
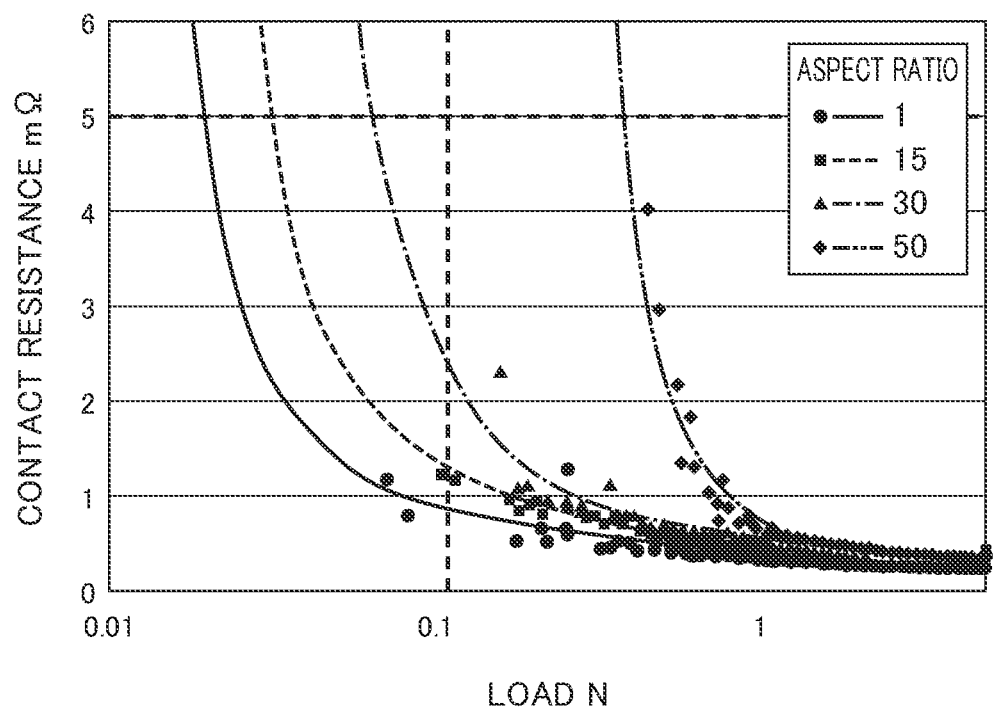
FIG. 17 is a diagram showing the results of a load-contact resistance test (W-R test) of silver particles having different aspect ratios.

The relationship between the contact load and the contact resistance was evaluated with a self-made tester in order to clarify the influence of the aspect ratio of silver particles on an initial contact resistance (W-R test). Contacting starts as a probe is moved to gradually approach a plate from the state the probe and the plate are completely apart from each other, and a load increases with decreasing distance therebetween. The relationship between the change in the load during that operation and the contact resistance was measured, and thus, W-R curves were formed as shown in FIG. 17.

The contact resistance was measured by a four-terminal method. The test was carried out under the conditions of a load ranging from 0 to 5 N, an open circuit voltage of 20 mV, and a measurement current of 10 mA (four terminal method).

The evaluation criteria of the W-R test are shown in Table 4.

TABLE 4

| Evaluation category | Unit | Reference value |
| --- | --- | --- |
| Contact resistance at 0.1N contact load in W-R curve | mΩ | Less than 5.0 |

In the row "Effect" in Table 5 shown below, "good" represents a case that satisfies the reference value in the above evaluation category, and "excellent" represents a case with particularly good characteristics among these.

"Poor" represents a case that fails to satisfy a reference value in the above evaluation category.

Examples 1 to 3 and Comparative Example 1

Table 5 shown below shows the results of the test using Compositions 1 to 4. The contact resistance at 0.1 N contact load (during sliding) and the friction coefficient at 0.1 N contact load (during sliding) show maximum values obtained until a Cu surface was exposed.

TABLE 5

| | | Comparative Example | Example | | |
|---|---|---|---|---|---|
| | | 1 | 1 | 2 | 3 |
| Type of composition | | 1 | 2 | 3 | 4 |
| Sliding test | | | | | |
| Evaluation category | Contact resistance at 0.1N contact load (during sliding) (mΩ) | No current passed | 2.5 | 0.9 | 0.5 |
| | Friction coefficient at 0.1N contact load (during sliding) | 0.1 | 0.1 | 0.1 | 0.1 |
| | Number of sliding cycles at 0.1N contact load until a Cu surface becomes exposed (cycles) | Not less than 1000 | Not less than 1000 | Not less than 1000 | Not less than 1000 |
| | Effect (sliding durability and low contact resistance) | Poor | Good | Excellent | Excellent |
| Load-Contact resistance test (W-R test) | | | | | |
| Evaluation | | Poor | Good | Excellent | Excellent |

The sliding durability was good in each case because the contact load was as low as 0.1 N.

In Comparative Example 1 with silver particles having an average aspect ratio of 50, no current passed so that the contact resistance at 0.1 N contact load was not able to be measured. In Examples 1 to 3 with silver particles having an average aspect ratio of 30 or less, the contact resistance at 0.1 N contact load was less than 5.0 mΩ, thus striking a balance between low electrical resistance and sliding durability. In Examples 2 and 3 with silver particles having an average aspect ratio of 15 or less, the contact resistance at 0.1 N contact load was less than 1.0 mΩ, thus being particularly excellent in low electrical resistance.

The W-R curves in FIG. 17 reveal that the contact resistance decreases at a low load as the aspect ratio is closer to 1. Further, it is revealed that when the aspect ratio is 30 or less, the contact resistance can achieve a value of less than 5 mΩ even at a load lower than 0.1 N.

What is claimed is:

1. A contact member comprising:
    a metal base; and
    a coating disposed on at least part of the metal base, the coating containing a fluorinated oil having a polar group, and metal particles surface-treated with a fluorine-based compound having a polar group,
    wherein the metal particles have an average aspect ratio (length of long axis/length of short axis) of 30 or less, and
    the metal particles have an average primary particle size of 0.2 μm to 10.0 μm, and wherein a metal of the metal base is identical to that of the metal particles.

2. The contact member according to claim 1, wherein the polar group is a hydroxyl group.

3. A connector comprising the contact member according to claim 1.

4. A method for producing the contact member according to claim 1, comprising forming the coating by supplying a composition comprising the fluorinated oil having the polar group; and the metal particles surface-treated with the fluorine-based compound having the polar group,
    wherein the metal particles have an average aspect ratio (length of long axis/length of short axis) of 30 or lesson the metal base.

* * * * *